(12) United States Patent
Reynolds, III

(10) Patent No.: US 6,830,595 B2
(45) Date of Patent: Dec. 14, 2004

(54) METHOD OF MAKING COMPOSITE ELECTRODE AND CURRENT COLLECTORS

(75) Inventor: Robert A. Reynolds, III, Bay Village, OH (US)

(73) Assignee: Advanced Energy Technology Inc., Wilmington, DE (US)

(*) Notice: Subject to any disclaimer, the term of this patent is extended or adjusted under 35 U.S.C. 154(b) by 0 days.

(21) Appl. No.: 10/326,469

(22) Filed: Dec. 20, 2002

(65) Prior Publication Data
US 2004/0120100 A1 Jun. 24, 2004

(51) Int. Cl.⁷ .................................................. H01G 9/00
(52) U.S. Cl. ..................................... 29/25.03; 361/502
(58) Field of Search ........................... 29/25.01–25.03; 361/502

(56) References Cited

U.S. PATENT DOCUMENTS

| | | | |
|---|---|---|---|
| 3,404,061 A | 10/1968 | Shane et al. .............. 161/125 |
| 4,675,094 A | * 6/1987 | Kaminaga et al. ..... 204/290.11 |
| 4,895,713 A | 1/1990 | Greinke et al. ............. 423/448 |
| 5,538,611 A | 7/1996 | Otowa ......................... 204/550 |
| 5,779,891 A | 7/1998 | Andelman ................ 210/198.2 |
| 5,902,762 A | 5/1999 | Mercuri et al. ................ 501/99 |
| 5,955,215 A | * 9/1999 | Kurzweil et al. .............. 429/41 |
| 6,094,788 A | 8/2000 | Farahmandi et al. ........ 25/25.41 |
| 6,134,760 A | * 10/2000 | Mushiake et al. .......... 29/25.03 |
| 6,410,128 B1 | 6/2002 | Calarco et al. ........... 428/313.9 |

\* cited by examiner

Primary Examiner—Ha Tran Nguyen
(74) Attorney, Agent, or Firm—Waddey & Patterson; James R. Cartiglia

(57) ABSTRACT

Composite electrode/current collectors for capacitors, e.g., a flow-through capacitor or electric double layer capacitor are disclosed. Also disclosed are methods for making a composite electrode/current collectors and capacitors having at least one composite electrode/current collector.

9 Claims, 2 Drawing Sheets

METHOD OF MAKING COMPOSITE ELECTRODE AND CURRENT COLLECTORS

BACKGROUND

1. Field of the Invention

The present invention relates to electrical devices, particularly, to composite electrodes/current collectors capacitors, such as electrochemical double layer capacitors, flow-through capacitors, and the like. The invention further relates to process of making such electrical devices.

2. Technical Background

Capacitors, such as flow-through capacitors may be used for many purposes, including chromatography, water purification, separation of blood components, and other circumstances in which separation of an ionic constituent from a liquid is desired, such as recovery of precious metals or other chemicals from a liquid stream. In a flow-through capacitor, a liquid, e.g., salt water, flows over the electrode to remove ionic constituents from the liquid. In an electrochemical double layer capacitor, the liquid mediates the movement of ions to and from the electrode. The use of flow-through capacitors for purification of water, for example deionization of salt water, is also known as "capacitive deionization."

Flow-through capacitors generally include one or more pairs of spaced apart electrodes—a cathode and an anode—with current collectors or backing layers provided that are generally adjacent to or very near the electrodes. There is also a flow path for a liquid to travel through the flow-through capacitor and contact the current collectors and electrodes. Current collectors are electrically conductive and communicate with the electrodes to carry an electrical charge.

Flow-through capacitors have been described in several patents, including U.S. Pat. No. 5,779,891, to Andelman, the disclosure of which is incorporated herein by reference. Flow-through capacitors may have any of several different configurations, such as a planar configuration illustrated in U.S. Pat. No. 5,538,611 or spiral-wound, crescent-pleated, or hexagonal-shaped configurations, as illustrated in U.S. Pat. No. 5,779,891. The selection of the shape of the flow-through capacitor is dependent upon the preferences of the user and may be of any conventional shape.

A conventional planar flow-through capacitor 9 is illustrated in FIG. 1. A separator 1 is provided that separates the flow-through capacitor 9 into a positive charge side and a negative charge side. Conductive high surface area material 2 is located adjacent to the separator 1 and is adjacent current collector 3. The conductive high surface area material 2 is porous. In the conventional flow-through capacitor 9 illustrated in FIG. 1, the conductive high surface area material 2 is held in place by the configuration of the flow-through capacitor 9, in which retaining plates 4 are fastened together (see below), compressing the elements of the capacitor there between in a "sandwich" fashion. Other flow-through capacitor configurations similarly have the conductive high surface area material 2 held against the current collector 3 by compressive force. Regardless of the specific configuration, the conductive high surface area material 2 also may be held against the current collector 3 by mechanical fastening, attachment, adhesion, or in any other conventional manner.

The current collectors 3 have terminals 3a extending therefrom and may have flow-through orifices 3b. The current collectors 3 may be made from a wide variety of materials, including copper, aluminum, and carbon boards.

The flow-through capacitor 9 is provided with retaining plates 4 that support the flow-through capacitor 9 and provide rigidity while enclosing the elements of the flow-through capacitor 9. Bolt holes 8 are provided to secure the retaining plates 4 to each other. The flow-through capacitor also has spacers 5 that provide an offset of the current collectors 3 from the retaining plates 4.

The retaining plates 4 are provided with a fluid inlet 6 for fluid to enter the flow-through capacitor 9 and a fluid outlet 7 for fluid to exit the flow-through capacitor 9 after it has contacted the conductive high surface area material 2.

Flow-through capacitors generally operate by applying a voltage across the electrodes, with the charge generated transferred to the current collectors. The current collectors, one with a positive charge and one with a negative charge, are contacted by the liquid stream and attract oppositely charged ions out of the liquid stream to the surface of the current collector. The efficiency of the flow-through capacitor is thus dependent on the amount of surface area available for contact with the liquid to attract ions therefrom.

Flow-through capacitors may be arranged in series or parallel, depending on the needs of the particular circumstances faced by a user, and they come in many different shapes and sizes.

When it is desired to release the collected ions, such as when the efficiency of the flow-through capacitor is reduced to a predetermined level, the electrodes may be shorted to ground or otherwise have the charges removed from the current collectors, causing the attracted ions to leave the surface of the collectors and return to the liquid stream. Thus the liquid stream at this point will have a higher concentration of the ions that were previously removed from the liquid passing through the flow-through capacitor. The liquid stream may be discarded or may be further treated to recover the ions that were released into the liquid stream. In such way, recovery of the ionic material may be accomplished.

This predetermined efficiency level may be measured, for example, by the conductivity of the liquid exiting the capacitor or by any other measure convenient for the user. The user may elect not to use a predetermined efficiency, but to discharge the ionic material after a preselected time interval or by any other method selected by the user for determining when to discharge the collected ionic material.

The electrically conductive backing materials in many flow-through capacitors are made from carbon cloth or flexible graphite. U.S. Pat. No. 6,410,128 B1, to Calarco, et al., the disclosure of which is incorporated herein by reference, describes the construction and use of flexible graphite as an electrode and backing material in flow-through capacitors.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and, thus, exhibit or possess many properties that are highly directional, e.g., thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g., webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles and graphite layers substantially parallel to the opposed faces of the sheet resulting from very high compression, e.g., roll pressing. Sheet material thus produced has excellent flexibility, good strength and a very high degree of orientation.

Briefly, the process of producing flexible, binderless anisotropic graphite sheet material, e.g., web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e., the direction perpendicular to the opposed, parallel sheet surfaces comprises the "c" direction and the directions ranging along the length and width, i.e., along or parallel to the opposed, major surfaces comprises the "a" directions and the thermal and electrical properties of the sheet are very different, by orders of magnitude, for the "c" and "a" directions.

SUMMARY OF THE INVENTION

One embodiment of the present invention provides composite electrode/current collectors in which the electrode material and the current collector material are combined into a single element and capacitors employing such a composite element.

Another embodiment of the invention provides methods of making a capacitor. The inventive method includes the step of mixing exfoliated graphite and electrode material thereby forming a mixture.

Additionally embodiments of the invention provide novel capacitors. These inventive capacitors comprise a separator, at least one pair of opposed retaining plates, and at least one composite electrode/current collector disposed between the separator and one of the opposed retaining plates.

Making a capacitor in accordance with the invention results in the advantage of a capacitor having increased adhesion between the electrode powder and the exfoliated graphite as compared to capacitors made in accordance with known techniques.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE INVENTION

Figure 1:
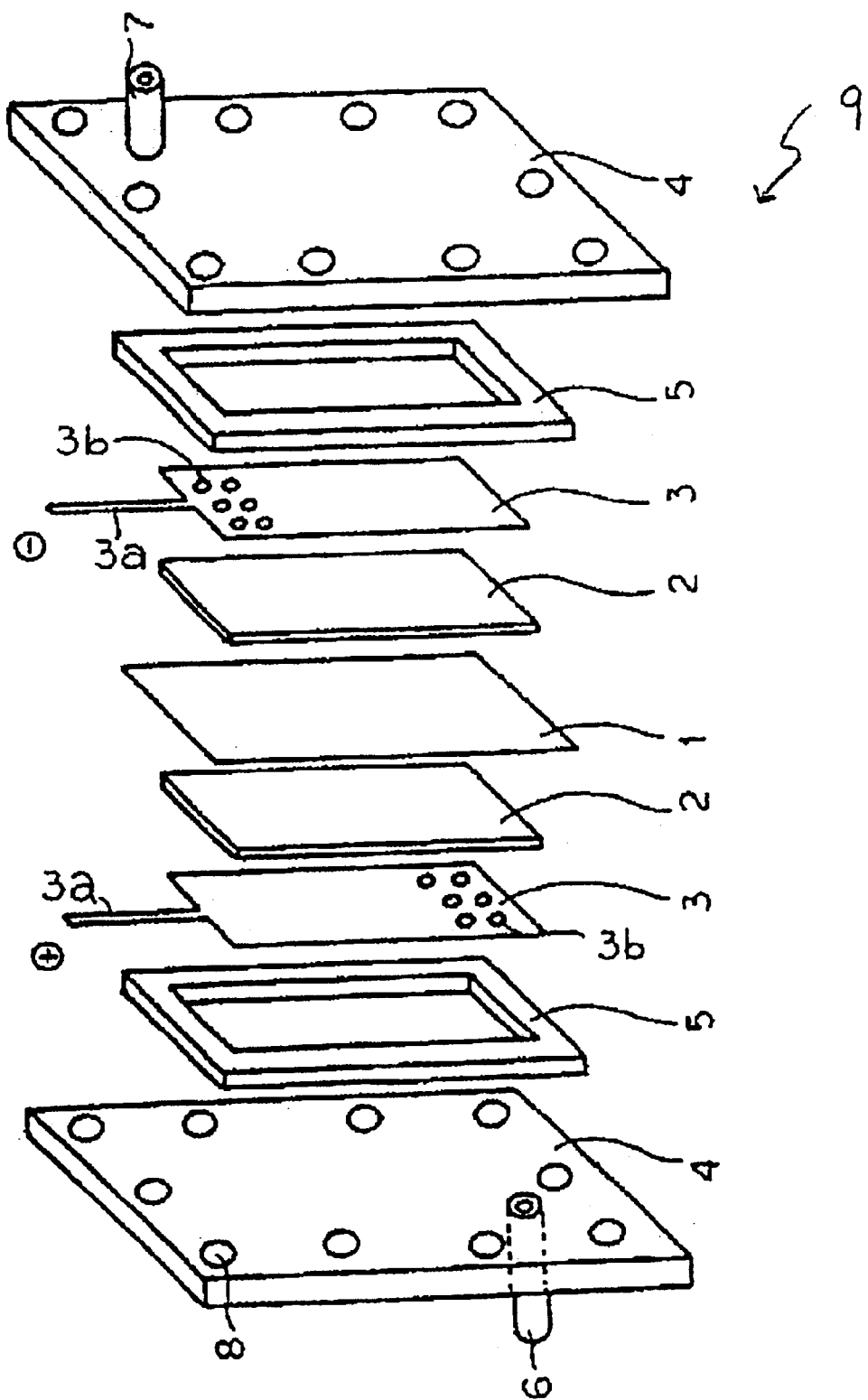
FIG. 1 is an exploded view of a conventional planar flow-though capacitor.

Certain embodiments of the present invention include providing source materials such as exfoliated graphite or flexible sheets of graphite material. The source materials typically comprise graphite, a crystalline form of carbon comprising atoms covalently bonded in flat layered planes with weaker bonds between the planes. In obtaining source materials such as the above flexible sheets of graphite, particles of graphite, such as natural graphite flake, are typically treated with an intercalant of, e.g., a solution of sulfuric and nitric acid, the crystal structure of the graphite reacts to form a compound of graphite and the intercalant. The treated particles of graphite are hereafter referred to as "particles of intercalated graphite" or "expandable graphite."

Upon exposure to high temperature, the intercalant within the graphite decomposes and volatilizes, causing the particles of intercalated graphite to expand in dimension as much as about 80 or more times its original volume in an accordion-like fashion in the "c" direction, i.e., in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials for the exfoliated graphite or flexible sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing "d" between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the exfoliated graphite or flexible sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite typically has an ash content of less than twenty weight percent. More typically, the graphite employed for the present invention will have a purity of at least about 94%. In certain preferred embodiments, the graphite employed will have a purity of at least about 99%.

A common method for manufacturing exfoliated graphite or graphite sheet is described by Shane, et al. in U.S. Pat. No. 3,404,061, the disclosure of which is incorporated herein by reference. In the typical practice of the Shane, et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g., trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In one preferred embodiment, the intercalating agent is a solution of a mixture of sulfuric acid, or sulfuric acid and phosphoric acid, and an oxidizing agent, i.e., nitric acid, perchloric acid, chromic acid, potassium permanganate, hydrogen peroxide, iodic or periodic acids, or the like. The intercalation solution may also contain metal halides such as ferric chloride, and ferric chloride mixed with sulfuric acid, or a halide, such as bromine as a solution of bromine and sulfuric acid or bromine in an organic solvent.

The quantity of intercalation solution typically ranges from about 20 to about 150 pph, and more typically about 50 to about 120 pph. After the flakes are intercalated, any excess solution is drained from the flakes and the flakes are water-washed.

Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g., by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative examples of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative examples of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative examples of alkyl esters are dimethyl oxylate and diethyl oxylate. Representative examples of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative examples of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

In certain preferred embodiments, the intercalation solution will be aqueous and will, preferably, contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period can be up to about 20 hours, with shorter heating periods, e.g., at least about 10 minutes, for higher temperatures in the above-noted range.

The thus treated particles of graphite are sometimes referred to as "particles of intercalated graphite." Upon exposure to high temperature, e.g., temperatures of at least about 160° C. and especially about 700° C. to 1200° C. and higher, the particles of intercalated graphite expand as much as about 80 to 1000 or more times their original volume in an accordion-like fashion in the c-direction, i.e., in the direction perpendicular to the crystalline planes of the constituent graphite particles. The expanded, i.e., exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g., by roll-pressing, to a thickness of about 0.05 mm to 4.00 mm and a typical density of about 0.1 to 1.5 grams per cubic centimeter (g/cc). From about 1.5 to 30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.01 to 0.005 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e., stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether or bisphenol A (DGEBA) and other multifunctional resin systems; phenolic resins that can be employed include resole and novolac phenolics.

Figure 2:
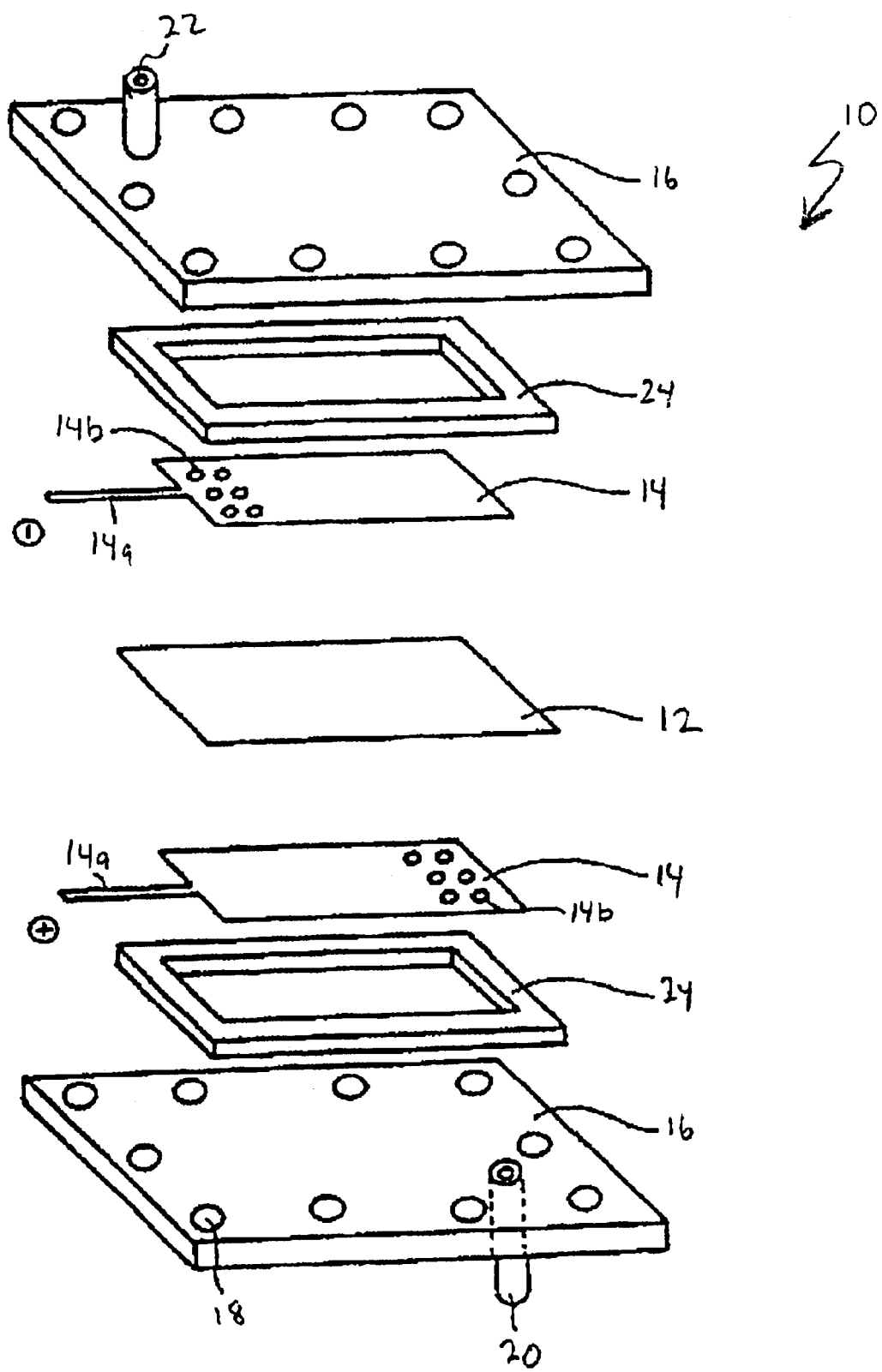
FIG. 2 is an exploded view of a planar capacitor in accordance with one embodiment of the present invention.

For convenience, in FIG. 2 the invention is described in terms of a composite electrode/current collector for a flow-through capacitor, but the invention is not limited thereto and may be used in a variety of applications, such as electrochemical double layer capacitors. The terms "flexible graphite" and "exfoliated graphite" (exfoliated graphite may also be referred to as "expanded graphite") are given the meaning described and explained in U.S. Pat. No. 6,410,128 B1. Flexible graphite is used herein to describe a compressed mass of exfoliated graphite particles in the form of a sheet having parallel, opposed first and second surfaces. Optionally, at least a portion of the sheet may have a plurality of transverse fluid channels passing through the sheet between the first and second parallel, opposed surfaces. The channels may be formed by mechanically impacting the first surface of the sheet at a plurality of locations to provide the channels with openings at both the first and second parallel, opposed surfaces. A "current collector" functions as an interconnect to remove stored energy from the electrode to another point such as a terminal.

The present invention eliminates the need for a current collector or backing layer separate from the electrodes and provides a composite electrode/current collector for use in a capacitor, e.g., a flow-through capacitor.

In accordance with one embodiment of the present invention, a composite electrode/current collector is provided for one of or each of the positive and negative side of the capacitor, instead of a separate electrode and conductive high surface area material for each side of the flow-through capacitor. FIG. 2 illustrates a planar capacitor 10 in accordance with the present invention. A separator 12 separates the capacitor 10 into a positive charge side and a negative charge side. The separator 12 is preferably electrically non-conductive and allows the passage of ions therethrough. It is also preferred that separator 12 is non-reactive with the electrolyte. A suitable separator 12 is filter paper. Other examples of a suitable material of construction for separator 12 includes polypropylene, polyethylene, Nafion®, and combinations thereof. Any conventional material used for the separator 12 may be used in the present invention without departing from the spirit and scope of the invention.

The flow-through capacitor has retaining plates 16, which may be made from any material used in capacitors. Preferably, plates 16 are non-conductive and do not allow passage of fluid therethrough. The retaining plates 16 may be provided with bolt holes 18 to fasten the retaining plates 16 together, but any conventional manner of securing the retaining plates 16, or of providing for the support, rigidity, and containment of the elements of the flow-through capacitor 10 may be used without departing from the spirit or scope of the invention. The retaining plates 16 also have a fluid inlet 20 to allow fluid (a.k.a. electrolyte) to enter the flow-through capacitor 10 and a fluid outlet 22 to allow fluid to exit the flow-through capacitor.

The capacitor 10 has composite electrodes/current collectors 14 that are a combination of the material of an electrode with the material of a current collector in a single element. Terminals 14a are provided on the composite electrodes/current collectors 14 for connection with a voltage source (not shown), and composite electrodes/current collectors 14 may be provided with flow-through orifices 14b. By providing composite electrodes/current collectors 14, the issue of connecting the conductive high surface area material to the current collector for effective charge transfer is mitigated, the number of elements in the capacitor 10 is reduced, and the charge is more efficiently distributed into the high surface area for contact with the ionic material in the liquid stream. The inventive capacitor also has reduced contact resistance as compared to a conventional capacitor.

The capacitor 10 may also be provided with spacers 24 between the retaining plates 16 and the composite electrode/current collectors 14, and the spacers 24 may be made from any conventional material.

In one embodiment a material particularly suitable for use as an electrode in a capacitor is a combination of a high surface area carbonaceous material, e.g., carbon black with a binder, e.g., PTFE The PTFE is generally present as a binder and to provide good mechanical integrity for the carbon black. Additionally, the PTFE is hydrophobic and may act as a wet-proofing agent. Preferably, the material comprises at least about 70% carbonaceous material and less than about 30% binder, more preferably at least about 75% of the carbonaceous material, even more preferably at least about 80% of the carbonaceous material, and most preferably at least about 85% of the carbonaceous material. Suspending the carbon material in a solvent and drop-wise adding the binder to the suspended carbonaceous material may form the aforementioned combination of the carbonaceous material and binder. Another advantage of the invention is that a capacitor may be formed in accordance with the invention without practicing the step of forming the binder and carbonaceous material into a discrete sheet. In the invention, the electrode powder may be combined with an exfoliated graphite current collector material to form the composite assembly. Preferably, the electrode powder is the carbon black/PTFE material described above and the current collector material is the exfoliated graphite described above. In one particular embodiment, the mass of exfoliated graphite comprises about 0.48 g and the mass of the PTFE activated carbon combination comprises about 1.9 g.

The invention also provides methods of making a capacitor. The methods typically include the steps of mixing an effective amount of exfoliated graphite and electrode material thereby forming a mixture. In certain preferred embodiments, the mixture comprises at least about 5 wt % of the exfoliated graphite. In other preferred embodiments, the electrode material comprises at least one of graphite, carbon nanotubes, activated carbon fibers, graphite fibers, carbon nanofibers, graphite nanofibers, carbon black, activated carbon, and combinations thereof. It also sometimes preferred that the electrode material has a surface area which comprises at least about 200 m$^2$/g. Some preferred surfaces areas comprise at least about 500 m$^2$/g, at least about 1000 m$^2$/g, at least about 1500 m$^2$/g, and at least about 2000 m$^2$/g. The aforementioned activated carbon may be formed by carbonizing a carbon containing precursor by heating the precursor to at least about 500° C., or at least about 1600° C. The exact temperature and pressure conditions will depend on the particular precursor being carbonized. The carbonized precursor may then be oxidized to form the above high surface area material.

The methods of the present invention may further comprise the steps of compressing the mixture and calendaring the mixture. Optionally, a temperature of the mixture during the calendaring step may comprise at least about 25° C. Additionally, the temperature of the mixture during the calendaring step may comprise greater than about 25° C. In the case that the calendaring temperature comprises greater than about 25° C., the mixture may comprises a thermoplastic binder. It is sometimes preferred that the thermoplastic binder comprises a compound substantially non-reactive with an electrolyte of the capacitor.

In certain specific embodiments of the invention, the methods further comprise forming a bed of the exfoliated graphite and the mixing comprises dispersing the electrode material onto a top surface of the bed of the exfoliated graphite. Here, the electrode material may be dispersed by a vibrational device. Alternatively, the invention may include forming a bed of the electrode material and wherein the mixing step may comprise dispersing the exfoliated graphite onto the bed of the electrode material.

In other embodiments of the invention, the methods further comprise compressing the exfoliated graphite into a sheet having a density of at least about 0.6 g/cc. In these embodiments, it is sometimes preferred to have the mixing step comprise dispersing the electrode material onto a top surface of the sheet of the exfoliated graphite. The density of the sheet may be determined by dividing the mass of the sheet by the volume of the sheet.

The inventive methods may also include the step of compounding the electrode material with a polymeric binder. In certain preferred embodiments, the polymeric binder comprises a thermoplastic. It is also sometimes preferred that the binder is substantially non-reactive with the electrolyte of the capacitor. Examples of suitable electrolytes include aqueous potassium hydroxide, aqueous sulfuric acid, organo-carbonates, inorganic salts (e.g., tetraethyl ammonium tetrafluoroborate) dissolved in organo-carbonates, and combinations thereof. Examples of preferred binders include fluorinated compounds (e.g., polytetrafluoroethylene "PTFE" and polyvinylidene fluoride "PVDF"), carboxy methyl cellulose, polypropylene and polyethylene. An embodiment of the binder may comprise one or more of the above binders as a solute in an appropriate solvent.

In another embodiment of the invention, the exfoliated graphite comprises at least about 95% by wt. of graphite and less than about 100 ppm of each individual transition metal. In certain preferred embodiments, the exfoliated graphite comprises at least 99% graphite, and even more preferably at least about 99.9% graphite. Specific embodiments of the invention may also include the step of altering the electrode material to a preferred particle size. One suitable electrode material particle size is about 300 $\mu$m to about 900 $\mu$m, more preferably about 600 $\mu$m.

Another embodiment of the invention provides a capacitor, such as an electro-chemical double layer capacitor. In certain preferred embodiments, the capacitor comprises separator, at least one pair of opposed retaining plates, and at least one composite electrode/current collector disposed between the separator and one of the opposed retaining plates, wherein the composite electrode/current collector comprises a compressed mass of exfoliated graphite and electrode material formed into a single element. Typically, the electrode material comprises activated carbon having, as a bulk measurement by a Microtrac BET analyzer, a surface area of at least about 200 m$^2$/g. Examples of other surface areas for the electrode material are listed above, as wells as the sizes of at least about 1800 m$^2$/g and at least about 2400 m$^2$/g. In choosing a particular surface area for the electrode material, the higher the surface area of the material the more energy that can be stored on the electrode/current collector composite.

In one specific embodiment of the inventive capacitor, the compressed mass comprises up to about a 100 $\mu$m thick layer of the exfoliated graphite. In another embodiment of the inventive capacitor, the compressed mass may comprises a sheet of the exfoliated graphite and the sheet has an area weight of no more than about 7.7 mg/cm$^2$. The area weight of sheet may be determined by dividing the mass of the sheet by the surface area of the sheet. In a further embodiment of the inventive capacitor, it is sometimes preferred that the capacitor is substantially devoid of an aluminum element having a thickness of more than about 15 μm. In these circumstances, it is sometimes more preferred that the capacitor substantially devoid of an aluminum element capable of conducting electricity.

As stated above the electrode material may comprise a polymeric binder, e.g. a thermoplastic resin. In certain preferred embodiments, the polymeric binder is substantially non-reactive with an electrolyte of the capacitor. In other preferred embodiments, the binder is substantially corrosive resistant. One example of a suitable electrode material mixture comprises up to about 10% of the binder, up to about 10% of filler, and at least about 80% of the electrode material. Optionally, the electrode material may or may not include a conductive additive, e.g., glassy carbon. The conductive additive may be added to the electrode/current collector composite to enhance the rate at which the composite releases the stored energy. The above methods may be used in the manufacture of a flow-through capacitor or an electro-chemical double layer capacitor.

EXAMPLES

The invention will be further clarified by the following examples. In the below examples, the electrolyte was a 38% by weight aqueous solution of sulfuric acid. Each sample assembly was soaked at least 18 hours in the electrolyte prior to testing.

Example 1

Electrode powder having carbon black and PTFE with a particle size of between about 600 μm and about 900 μm was mixed with exfoliated graphite and the resulting mixture was pressed and calendered at ambient temperature, about 25° C. The resulting sheet produced an acceptable composite electrode/current collector.

Example 2

Electrode powder having carbon black and PTFE with a particle size of between about 600 μm and about 900 μm was sprinkled onto a bed of exfoliated graphite. The resulting mixture was pressed and calendered at ambient temperature. The electrode/current collector assembly had a thickness of about 0.06 cm and a density of about 0.48 g/cc. The capacitance of the assembly was tested in accordance with test method DOD-C-29501. The resulting sheet produced an acceptable composite electrode/current collector. The capacitance of the assembly was about 4.7 F, the specific capacitance was about 104 F/g, and the volume capacitance was about 50 F/cc.

Example 3

Electrode powder having carbon black and PTFE with a particle size of between about 600 μm and about 900 μm was sprinkled on a sheet of flexible graphite having a density of about 7.7 mg/cm$^2$ and a thickness of about 100 μm. The resulting sheet with electrode powder was pressed and calendered at ambient temperature and produced an acceptable composite electrode/current collector.

Example 4

About 0.75 g of GTA grade exfoliated graphite, from Garftech Inc. of Lakewood, Ohio, was sprinkled onto a bed of about 2.0 g of electrode powder having carbon black and PTFE with a particle size of between about 600 μm and about 900 μm that was in a 2 inch by 6 inch aluminum die. The material was then pressed and calendered at ambient temperature. The sheet produced had a thin layer, about 100 μm thick, of flexible graphite and a layer about 600 μm thick of electrode material. The sheet had a density of about 0.55 g/cc. The electrode/current collector assembly was tested in accordance with the above DOD test method and it exhibited acceptable properties. The capacitance was about 7.5 F, the specific capacitance was about 107 F/g, and the volume capacitance was about 59 F/cc. Also the homogeneity of the distribution of the electrode material adhered to the flexible graphite in this example was better than for Examples 1 through 3.

While the present invention has been illustrated by the above description of embodiments, and while the embodiments have been described in some detail, it is not the intention of the Inventors to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the Inventors' general inventive concept.

What is claimed is:

1. A method of making a capacitor comprising:
   a. mixing an effective amount of exfoliated graphite and electrode material to form a mixture having at least about 5 wt % of said exfoliated graphite, wherein, said electrode material comprises:
      1) at least one material selected from the group consisting of: graphite, carbon nanotubes, activated carbon fibers, graphite fibers, carbon nanofibers, graphite nanofibers, carbon black, and activated carbon, and
      2) a surface area of said electrode material comprises at least about 200 m$^2$/g;
   b. compressing said mixture; and
   c. calendering said mixture.

2. The method according to claim 1, wherein the temperature of said mixture during said calendaring comprises at least about 25° C.

3. The method according to claim 1, further comprising forming a bed of said exfoliated graphite and wherein said mixing comprises dispersing said electrode material onto a top surface of said bed of said exfoliated graphite.

4. The method according to claim 1, further comprising compressing said exfoliated graphite into a sheet having a density of at least about 0.6 g/cc and wherein said mixing comprises dispersing said electrode mixture onto a top surface of said sheet of said exfoliated graphite.

5. The method according to claim 1, further comprising forming a bed of said electrode material, and wherein said mixing comprises dispersing said exfoliated graphite onto said bed of said electrode material.

6. The method according to claim 1, further comprising compounding said electrode material with a polymeric binder.

7. The method according to claim 6, wherein said polymeric binder comprises a fluorinated compound.

8. The method according to claim 1, wherein said exfoliated graphite comprises at least about 95% by wt of graphite, and less than about 100 ppm of each transition metal.

9. The method according to claim 1, wherein a particle size of at least a portion of graphite flake formed into the exfoliated graphite comprises less than about 1000 μm.

* * * * *